United States Patent [19]
Dafler et al.

[11] 3,805,521
[45] Apr. 23, 1974

[54] EXHAUST FLOW CONTROL SYSTEM

[75] Inventors: Gene L. Dafler, New Lebanon; Edwin H. Halsted; William J. Newill, both of Dayton, all of Ohio

[73] Assignee: General Motors Corporation, Detroit, Mich.

[22] Filed: Feb. 23, 1973

[21] Appl. No.: 334,995

[52] U.S. Cl............... 60/288, 23/288 F, 91/459, 91/469
[51] Int. Cl............................................ F01n 3/14
[58] Field of Search............ 60/288, 287; 23/288 F; 91/459, 469

[56] References Cited
UNITED STATES PATENTS
2,987,049  6/1961  McLeod............................ 91/459
3,043,336  7/1962  Parent............................. 137/625.5
3,097,074  7/1963  Johnson............................ 60/288

*Primary Examiner*—Douglas Hart
*Attorney, Agent, or Firm*—Arthur N. Krein

[57] ABSTRACT

An exhaust flow control system having a normally closed solenoid valve, operable as a function of the temperature in a catalytic converter, to control the flow of transmission hydraulic fluid under pressure to a hydraulic actuator to effect positioning of a converter bypass valve in the exhaust system of a vehicle, an internal return spring in the actuator and the solenoid valve providing for the shifting of the converter bypass valve to a bypass position during each engine operating cycle.

4 Claims, 4 Drawing Figures

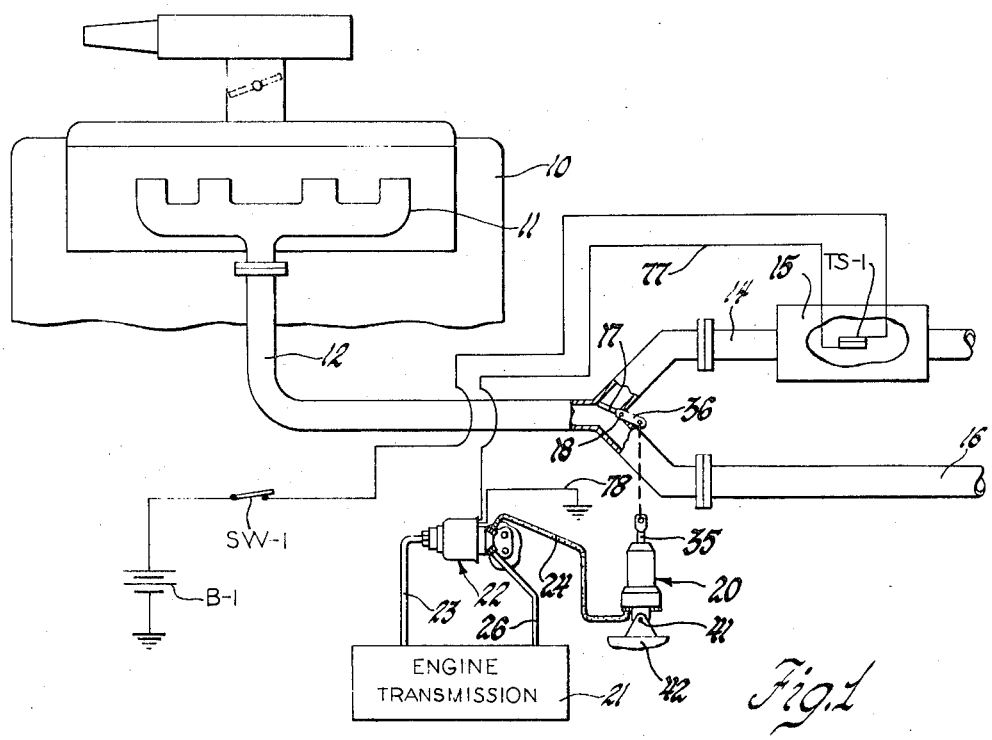
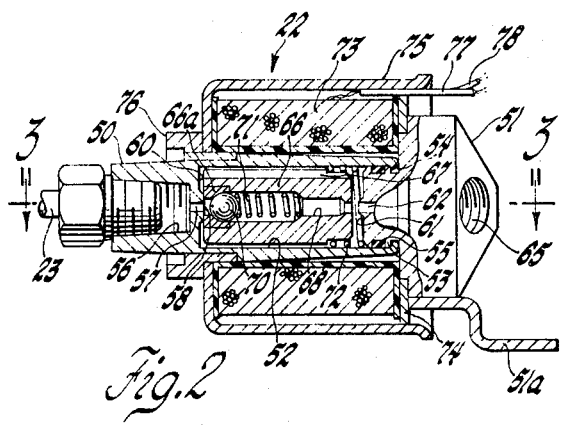

3,805,521

EXHAUST FLOW CONTROL SYSTEM

This invention relates to an exhaust flow control system for an internal combustion engine operated vehicle and in particular to a solenoid operated hydraulic control system for effecting operation of an exhaust system converter bypass valve for the engine of a vehicle.

During recent years, increasing emphasis has been placed on reducing the amount of objectionable components in the exhaust gases discharged from the internal combustion engine of a vehicle. Various devices and systems have been proposed to effect this reduction in exhaust emissions, including the use of a catalytic converter in the downstream end of the exhaust system of the engine. The use of such a catalytic converter can be helpful in rendering the exhaust gases dischraged into the atmosphere to be substantially innocuous. However, as is well known, because of the operating temperatures at which such catalytic converters must operate, their useful life is limited as compared to the life of other engine and vehicle components. In addition, it is also known that operation of a catalytic converter above a predetermined critical operating temperature, even if only for a short interval of time, can result in either damage to the catalytic converter or more rapid deterioration of the catalytic material than would normally occur under lower temperature operating conditions, thus requiring more frequent replacement of the catalytic converter.

Many devices have been proposed to prevent overheating of a catalytic converter during engine operation, as for example by the use of a control system having a valve to shunt or bypass exhaust gases around the catalytic converter to prevent its operation at or above a predetermined critical operating temperature. In such an exhaust bypass system, the bypass valve and its actuating mechanism must operate in a hostile environment and, as a result of this, rather complicated and expensive mechanisms have been proposed to effect exhaust bypass under certain operating conditions.

It is therefore a primary object of this invention to provide an exhaust flow control system whereby hydraulic fluid under pressure, available during engine operation from the engine transmission, is used to effect operation of a converter exhaust gas bypass valve hydraulic actuator.

Another object of this invention is to provide an exhaust flow control system whereby a normally closed solenoid valve controls the flow of hydraulic fluid from an engine transmission to a hydraulic actuator for actuation of an exhaust flow control valve, the operation of the solenoid valve being controlled by a thermostat switch positioned in thermal relation to the catalyst material in the catalytic converter and by the ignition switch for the engine so that the bypass valve in the exhaust duct is cycled at least once for every cycle of engine operation.

These and other objects of the invention are attained in an exhaust flow control system in which a bypass valve is positioned in the exhaust system and is operable by means of a hydraulic actuator to control the flow of exhaust gases through a catalytic converter as a function of catalytic converter bed temperatures sensed by a thermal switch which is used to de-energize a solenoid control valve which controls the flow of hydraulic fluid from the engine transmission to the hydraulic actuator.

For a better understanding of the invention, as well as other objects and further features thereof, reference is had to the following detailed description of the invention to be read in connection with the accompanying drawings, wherein:

FIG. 1 is a schematic illustration of the internal combustion engine of a vehicle with an exhaust flow control system in accordance with the invention having a hydraulic actuator to effect opening of an exhaust bypass valve and a solenoid valve to control the flow of engine transmission hydraulic fluid to the hydraulic actuator;

FIG. 2 is an enlarged sectional view of the solenoid valve of FIG. 1, the elements of the solenoid valve being shown with the solenoid de-energized;

FIG. 3 is a sectional view of a portion of the solenoid valve taken along line 3—3 of FIG. 2; and, FIG. 4 is an enlarged sectional view of the hydraulic actuator of FIG. 1, with the actuator being shown in its retracted position.

Referring now to FIG. 1, there is illustrated an internal combustion engine 10 provided with an exhaust system which includes an exhaust manifold 11 connected by an exhaust duct 12 to a conduit portion 14 connected to a catalytic converter 15 and to a converter bypass conduit 16. Selective flow through either the bypass conduit 16 or through the conduit portion and converter 15 is controlled by an exhaust flow control valve or bypass valve 17, a two-way valve pivotally supported by a shaft 18 at the fork in exhaust duct 12 for movement between an open position and a closed position relative to the bypass conduit 16, which correspond to a closed position and an open position, respectively, relative to conduit 14 and converter 15, the valve 17 being shown in solid line in FIG. 1 in its open position relative to the branch of conduit 12 leading to the bypass conduit 16 and in its closed position blocking flow to conduit 14. The bypass valve 17 functions to divert the engine exhaust gases through the bypass conduit 16 whenever the temperature in the catalytic bed of the catalytic converter 15 approaches a predetermined value to prevent a temperature rise within this catalytic converter of such magnitude so as to decrease its effectiveness.

Because of the hostile environment in which the bypass valve 17 must operate, it is desirable to provide an actuator for this valve which can provide a high actuating force, in a relatively small sized unit, to effect opening and closing of the bypass valve and which is controlled so as to effect cycling of this bypass valve 17 with each operating cycle of the engine. For this reason, a hydraulic actuator 20 is used to effect operation of the bypass valve 17 with the hydraulic actuator 20 using hydraulic fluid under pressure from a suitable source such as from the engine driven gear pump, not shown, of the conventional automatic transmission 21 of the vehicle, the gear pump supplying oil under pressure through a pressure regulator, not shown. The flow of hydraulic fluid under pressure from the outlet of the pump of the transmission 21 to the hydraulic actuator 20 is controlled by a solenoid control valve 22 in a manner to be described. The high pressure outlet of the gear pump of the transmission 21 is connected by a conduit 23 to the inlet of the solenoid control valve 22 with the flow from the solenoid control valve 22 to and from the hydraulic actuator being through a conduit 24. Return fluid flow from the hydraulic actuator is through the conduit 24 and the solenoid control valve 22 connected to conduit 26 for flow back to the sump or inlet of the gear pump of the transmission 21, the last mentioned conduit 26 also serving as a return bypass conduit from the solenoid control valve 22 to the sump or inlet of the gear pump of transmission 21.

The operation of the hydraulic actuator 20 is such that hydraulic pressure is used to effect movement of the bypass valve 17 to its closed position while a return spring effects opening of this control valve. As shown in greater detail in FIG. 4, the hydraulic actuator 20 includes an actuator housing formed of a cup-shaped bottom housing portion 30 and cup-shaped cover plate 31 with a roll diaphragm 32 sandwiched therebetween, the diaphragm 32 and housing portion 30 forming a variable volume hydraulic fluid chamber 33. A cup-shaped actuator member 34 is located concentrically on one side of the roll diaphragm 32, the side opposite chamber 33, and has one end of an actuator rod 35 secured thereto, the opposite end of the actuator rod, slidably extending through an aperture 31a in cover plate 31, being pivotally connected to one end of a valve actuating lever 36, the opposite end of this lever being fixed to the shaft 18 of the bypass valve 17. A return spring 37 positioned within the cover plate 31 abuts at one end against this member and at its other end against the actuator member 34 to normally bias the actuator member 34 and roll diaphragm 32 in a direction, to the retracted position shown in FIG. 4, to effect movement of the bypass valve 17 to the solid line position of this valve shown in FIG. 1 for open bypass flow through bypass conduit 16 while blocking flow through conduit 14 and the catalytic converter 15. The housing portion 30 is provided with an inlet-outlet passage 38 to the chamber 33 connected to conduit 24. As shown in FIG. 4, the housing portion 30 can also be provided with a small orifice passage 39 from the chamber 33 for a purpose to be described hereinafter, but which in the embodiment being now described is not used, the passage 39 being closed by a plug 40. Housing portion 30 is also provided with a depending apertured support portion 30a for pivotal connection as by a stub shaft 41 to a suitable fixed frame member 42 of the vehicle whereby the hydraulic actuator 20 is suitably mounted adjacent to the converter bypass valve 17. As shown in FIG. 1, portions of the conduit 24 adjacent to the hydraulic actuator is of flexible material to permit limited pivotal movement of the hydraulic actuator about the axis of stub shaft 41.

Referring now in particular to FIGS. 2 and 3, the solenoid control valve 22 includes a two-piece valve housing consisting of a tubular valve body 50 and an outlet body 51, the valve body 50 having an enlarged bored passage 52 at one end thereof which is partly closed by the reduced diameter portion 53 of the outlet body inserted therein, these elements being secured together as by inwardly spinning over the bored passage end of the valve body to form a radial inward extending annular flange 54 received in a suitable annular groove provided for this purpose in the reduced diameter portion 53 of the outlet body, an O-ring seal 55 being positioned in a second annular groove provided for this purpose in the reduced diameter portion 53 of the outlet body inboard of the groove receiving annular flange 54.

The valve body 50 is provided at its opposite end from the bored passage with a threaded inlet passage 56 to receive the threaded coupling end of conduit 23, this passage being connected by an orifice passage 57, of a predetermined size, to the bored passage 52 in the valve body, the orifice passage 57 extending through an annular protrudence of the valve body extending axially into the bored passage to provide a valve seat 58 spaced axially inward into bored passage 52 from the internal shoulder 60 of the valve body at the end of this passage 52.

The outlet body 51 is also provided with an axial protrudence extending from the reduced diameter portion 53 thereof to provide a valve seat 61 surrounding a centrally located axial extending passage 62 in the valve body which is connected in fluid flow relationship to a sump discharge passage 63 suitably threaded to receive the threaded coupling of conduit 26. In addition, a second discharge passage 64 radially offset from the passage 62 and extending from the end wall 53a of the reduced diameter portion 53 of the outlet body to an actuator discharge passage 65 suitably threaded to receive the coupling of conduit 24 for delivery of oil under pressure to the hydraulic actuator 20. The solenoid control valve 22 is adapted to be mounted to a fixed support of the vehicle by means of a support bracket 51a, secured as by welding to the outlet body 51.

A solenoid plunger and relief valve assembly is slidably journalled within the bored passage 52 and includes a solenoid plunger 66 having one or more axially extending grooves or splines 67 on the outer periphery thereof, the plunger also being provided with a stepped bore therethrough to provide a relief passage 68, flow through which is controlled by a high pressure relief valve. The relief valve, in the embodiment shown, includes an apertured valve seat insert 66a suitably secured in one end of the relief passage 68 of the plunger 66 to provide a seat for the valve element 70, in the form of a ball, which is normally biased into seating engagement with the valve seat insert by a spring 71 having one end in abutment against a shoulder of the relief passage within the plunger 66 and its other end engaging the valve element 70. A spring 72 is positioned within the bored passage 52 of the valve housing to normally bias the plunger 66 in one direction, to the left as seen in FIG. 2, whereby the plunger will seat against the valve seat 58 to block fluid flow from orifice passage 57 into the bored passage 52 when the solenoid control valve is de-energized.

A spool and solenoid coil unit 73 is positioned to encircle the valve body 50 and is retained in position at one end by a washer-type cover plate 74 seated against a shoulder of the outlet body 51 and by a cup-shaped solenoid cover 75 encircling the spool and solenoid coil unit, the latter being retained axially with respect to the valve body by means of a nut 76 suitably secured to the valve body 50, as by staking.

The electrical leads 77 and 78 of the solenoid coil of the unit 73 are suitably connected to an electrical circuit as shown in FIG. 1, the solenoid coil being connected through a normally closed thermal switch TS–1 and the ignition switch SW–1 of the vehicle to a suitable source of electrical power, such as battery B–1. The thermostat switch TS–1 is suitably positioned in thermal relationship to the catalyst bed of the catalytic converter 15 so that when the catalyst bed temperature reaches a predetermined value, the contacts of this switch will open.

In the operation of the exhaust flow control system, when the ignition switch SW-1 is open, the solenoid control valve 22 is de-energized so that the spring 72 biases the plunger 66 of the solenoid control valve to the left, to the position shown in FIG. 2, with the plunger 66 and the valve seat insert 66a thereof seated against the valve seat 58. Of course, with the ignition switch SW-1 open, the engine 10 is not in operation and therefore the gear pump of the transmission 21 is not operating to provide hydraulic fluid under pressure to either the solenoid control valve 22 or to the hydraulic actuator 20. With no hydraulic fluid under pressure being supplied to the hydraulic actuator 20, the spring 37 of this unit maintains the diaphragm 32 and actuator member 34 in the retracted position, as shown in FIG. 4, whereby the bypass valve 17 is held in its open position relative to the bypass conduit 16 and closed relative to the conduit portion 14.

When the ignition switch SW-1 is closed to effect operation of the engine 10, the solenoid control valve 22 is energized through the normally closed thermostat switch TS-1 so that the plunger 66 moves to the right, with reference to FIG. 2, against the bias of spring 72 so that the right-hand end of the plunger 66 seats against the valve seat 61 on the outlet body 51 to normally block fluid flow from the bored passage 52 through the passage 62. With the closure of the ignition switch and engine 10 then in operation, the gear pump of the transmission 21 will pump hydraulic fluid under pressure to the solenoid control valve 22 with this hydraulic fluid flowing at a controlled rate through the orifice passage 57 into the bored passage 52, the fluid then flowing in the splined grooves 67 of the plunger and then through the discharge passage 64 and conduit 24 to the inlet passage 38 and then chamber 33 of the hydraulic actuator 20 to act against the diaphragm 32 to effect movement of the actuator member 34, against the biasing action of the spring 37, to an actuated position to effect closing of the bypass valve 17 to block flow through the converter bypass conduit 16 whereby all exhaust gases discharged from the engine into the exhaust manifold 11 will flow through exhaust duct 12 into the conduit portion 14 for flow through the catalytic converter 15.

Thus, during engine operation, and as long as the temperature in the catalytic converter 15 remains below a predetermined temperature, the bypass valve 17 will be held in a closed position by the hydraulic actuator 20. However, in the event that during engine operation, the temperature in the catalytic converter 15 reaches a predetermined temperature, this temperature will be sensed by the thermostat switch TS-1 to effect opening of its contact to effect de-energization of the solenoid control valve 22. When this occurs, the plunger 66 will then be moved by the spring 72 to the left to effect unseating of the piston plunger 66 from the valve seat 61 to permit flow of fluid from the bored passage 52 to the passage 62 whereby hydraulic fluid will flow through conduit 26 directly to the sump or inlet of the pump of transmission 21, thereby reducing the pressure of the hydraulic fluid in the chamber 33 of the hydraulic actuator whereby the spring 37 of this actuator can move the actuator member 34 to the retracted position to effect movement through the actuator rod 35 of the bypass valve 17 to its open position relative to bypass conduit 16 to permit the bypass flow of exhaust gases through the bypass conduit 16. As this occurs, fluid discharged from the chamber 33 will freely flow through passage 38 and conduit 24 for return via the solenoid control valve 22 to the sump in the manner just described.

The spring loaded valve element 70 in the relief passage 68 on the axis of a plunger 66 acts as a high pressure relief valve, whether the solenoid control valve 22 is energized or de-energized, to prevent high pressure surges of hydraulic fluid during acceleration, shifting and other transient conditions of engine operation to reach the hydraulic actuator.

When the temperature in the catalytic converter 15 again drops below a predetermined temperature value, the contacts of the thermostat switch TS-1 will again close to effect energization of the solenoid control valve 22 whereby hydraulic fluid under pressure is again supplied to the hydraulic actuator 20, in the manner previously described.

When the engine is then stopped, as by opening the contacts of the ignition switch SW-1, the solenoid control valve 22 is again de-energized to effect opening of the bypass valve 17 in the same manner described above with reference to the deenergization of the solenoid control valve 22 upon the opening of the contacts of thermostat switch TS-1.

With the arrangement of the exhaust flow control system as described above, the internal return spring 37 in the actuator 20 and the normally closed solenoid control valve 22 effect opening of the bypass valve 17 to effect a bypass mode of operation to protect the catalytic converter in the event of any electrical or hydraulic breakdown. In addition, with the arrangement described, the bypass valve 17 is cycled between its closed and open positions each time the engine starts and stops to help keep it freely operable.

It is to be realized that various modifications can be made by those skilled in the art to the apparatus described without departing from the scope of the invention. Thus, for example, if cooling of the actuator is desired, the passage 39, previously described in the housing portion 30 will provide the ability to use circulating hydraulic fluid as a coolant for the actuator. To do this, the passage 39 can be vented directly to the sump, as by connecting this passage by a separate conduit, not shown, to the conduit 26. This would permit limited flow of hydraulic fluid through the actuator while simultaneously permitting the hydraulic pressure to remain high in the actuator chamber 33.

What is claimed is:

1. An exhaust flow control system for a vehicle having an internal combustion engine with an exhaust system including a catalytic converter and a converter bypass conduit, the converter bypass conduit having a bypass valve pivotally mounted therein for movement between a closed position to cause exhaust flow through the catalytic converter and an open position to cause bypass flow of exhaust gases, and an engine driven oil pump having an inlet and an outlet; the exhaust flow control system including a hydraulic actuator mounted to the vehicle and having an actuator rod operatively connected to the bypass valve to effect movement of the bypass valve between the closed position and the open position, a spring means to normally bias the actuator rod to effect movement of the bypass valve to the open position, said hydraulic actuator having a variable volume hydraulic chamber therein with a fluid connection to said hydraulic chamber, a solenoid control valve having an inlet operatively connected to the outlet of the engine driven pump, a first outlet operatively connected to said fluid connection inlet of said hydraulic actuator and a second outlet operatively connected to the inlet of the pump and a plunger movable between a first position to prevent fluid pressure at said first outlet and a second position to block flow to said second outlet, said plunger having at least one fluid passage on the outer periphery thereof, said solenoid control valve further including spring means positioned to normally bias said plunger to said first position when said solenoid control valve is de-energized, and electrical circuit means operatively connecting said solenoid control valve to a source of electrical power, said electrical circuit means including an engine ignition switch and a normally closed thermostat switch positioned in thermal relation to the catalytic converter.

2. An exhaust flow control system according to claim 1 wherein said inlet and said second outlet of said solenoid control valve are in axial alignment with each other and with the axis of said plunger and wherein said plunger includes an axial extending relief passage therethrough and a spring biased relief valve positioned in said relief passage.

3. An exhaust flow control system for a vehicle having an internal combustion engine with an exhaust system including a catalytic converter and a converter bypass conduit, the converter bypass conduit having a bypass valve pivotally mounted therein for movement between a closed position to cause exhaust flow through the catalytic converter and an open position to cause bypass flow of exhaust gases and an oil pump driven by the engine, the oil pump having an inlet and an outlet; the exhaust flow control system including a hydraulic actuator having a housing mounted to the vehicle, a pressure responsive means movably positioned in said housing and forming with said housing a variable volume fluid chamber, an actuator rod operatively connected at one end to said pressure responsive means and at its other end operatively connected to the bypass valve to effect movement of the bypass valve between the open position and the closed position, said pressure responsive means including spring means to normally effect movement of said actuator rod to move the bypass valve to the open position, said housing including an inlet to said fluid chamber, a solenoid control valve including a valve housing having a partly closed first end and a partly closed second end with a bored passage therebetween, an inlet in said first end to said bored passage and operatively connected to the outlet of the oil pump, a first outlet and a second outlet in said second end of said valve housing, said first outlet being operatively connected to the inlet of said housing and said second outlet being operatively connected to the inlet of the oil pump, a plunger operatively positioned in said bored passage of said valve housing for movement between a first position blocking flow from said inlet to a second position normally blocking flow from said bored passage to said second outlet while permitting flow through said first outlet from said bored passage, said plunger forming with the peripheral wall of said bored passage in said valve housing a fluid flow passage extending from opposite ends of said plunger, spring means positioned in said bored passage in said housing to normally bias said plunger to said first position, and electrical coil means positioned to encircle said housing and said plunger, electrical circuit means operatively connecting said electrical coil means to a source of electrical power, said electrical circuit means including an engine ignition switch and a normally closed thermostat switch positioned in thermal relation to the catalytic converter to effect energization and de-energization of said coil.

4. A solenoid control valve for use in controlling the flow of hydraulic fluid from an engine driven oil pump to a hydraulic actuator connected to effect opening and closing of a bypass valve regulating the flow of exhaust gases through a catalytic converter in the exhaust system of an internal combustion engine, the solenoid control valve including a valve housing having a partly closed first end and a partly closed second end with a cylindrical passage therebetween, an inlet in said first end to said passage adapted to be connected to the outlet of the oil pump, a first outlet in said second end from said passage adapted to be connected to the hydraulic actuator and a second outlet in said second end from said passage adapted to be connected to the inlet of the oil pump, a plunger slidably positioned in said passage and forming therewith a flow passage for fluid, said plunger being movable between a first position blocking flow from said inlet to a second position normally blocking flow from said passage to said second outlet, said inlet and said second outlet being in axial alignment with each other and the axis of said plunger, said plunger having an axial extending relief passage therethrough and a sring biased relief valve positioned in said relief passage, spring means positioned in said valve housing to normally bias said plunger to said first position and electrical coil means positioned to encircle said housing and said plunger adapted to be connected to a source of electrical power.

* * * * *